(12) United States Patent
Burtch

(10) Patent No.: US 8,849,532 B2
(45) Date of Patent: *Sep. 30, 2014

(54) ADAPTABLE THERMAL MANAGEMENT OF A VEHICLE DUAL-CLUTCH TRANSMISSION

(75) Inventor: Joseph B. Burtch, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/452,137

(22) Filed: Apr. 20, 2012

(65) Prior Publication Data

US 2013/0282247 A1 Oct. 24, 2013

(51) Int. Cl.
*F16H 59/60* (2006.01)
*F16H 59/00* (2006.01)
*B60W 10/02* (2006.01)

(52) U.S. Cl.
USPC .................. 701/67; 477/70; 477/76; 477/97; 477/98; 477/174

(58) Field of Classification Search
USPC ............ 701/33.4, 60, 67; 477/70, 76, 97, 98, 477/174, 175, 176
See application file for complete search history.

(56) References Cited

U.S. PATENT DOCUMENTS

| 4,651,142 | A  | * | 3/1987 | Klatt ............................. 340/453 |
| 6,715,597 | B1 | * | 4/2004 | Buchanan et al. ......... 192/70.12 |
| 2006/0004506 | A1 | * | 1/2006 | Stehle et al. .................... 701/67 |
| 2010/0113216 | A1 | * | 5/2010 | Avny et al. ...................... 477/76 |
| 2010/0125399 | A1 | * | 5/2010 | Grolle ............................. 701/96 |
| 2010/0200357 | A1 | * | 8/2010 | Okabe et al. ............... 192/30 W |
| 2011/0024258 | A1 | * | 2/2011 | Avny et al. ............... 192/111.12 |
| 2011/0154945 | A1 | * | 6/2011 | Mohlin et al. .............. 74/665 D |
| 2011/0218719 | A1 | * | 9/2011 | Kirchner ......................... 701/53 |
| 2012/0078480 | A1 | * | 3/2012 | Diemer et al. .................. 701/60 |
| 2012/0123635 | A1 | * | 5/2012 | Brevick et al. ................. 701/36 |
| 2012/0290249 | A1 | * | 11/2012 | Hebbale et al. .............. 702/130 |
| 2013/0018556 | A1 | * | 1/2013 | Williams et al. ............... 701/60 |

FOREIGN PATENT DOCUMENTS

| DE | 19839837 | A1 | | 3/2000 |
| DE | 102004023581 | A1 | | 12/2005 |
| DE | 102005042971 | A1 | | 4/2006 |
| DE | 102012207613 | A1 | | 12/2012 |
| EP | 1447583 | A1 | * | 8/2004 |

OTHER PUBLICATIONS

Kulkarni et al., Shift dynamics and control of dual-clutch transmissions, Published May 18, 2006.*

* cited by examiner

*Primary Examiner* — Fadey Jabr
*Assistant Examiner* — Thomas Ingram
(74) *Attorney, Agent, or Firm* — Quinn Law Group, PLLC

(57) ABSTRACT

A method of managing clutch thermal loads in a multi-speed dual-clutch transmission (DCT) that is paired with an engine in a vehicle. The method includes assessing whether the vehicle is being accelerated and identifying a DCT clutch slipping during the acceleration. The method also includes determining vehicle parameters, determining an amount of time remaining for the clutch to stop slipping using the determined vehicle parameters, and determining an amount of time remaining until the clutch reaches a threshold temperature. The method additionally includes comparing the determined amount of time remaining for the clutch to stop slipping with the determined amount of time remaining until the clutch reaches the threshold temperature. Furthermore, the method includes activating an indicator if the determined amount of time remaining until the clutch reaches the threshold temperature is less than the determined amount of time remaining for the clutch to stop slipping.

19 Claims, 2 Drawing Sheets

ADAPTABLE THERMAL MANAGEMENT OF A VEHICLE DUAL-CLUTCH TRANSMISSION

TECHNICAL FIELD

The disclosure relates to a system and method employing adaptable thermal management for a multi-speed, dual-clutch transmission in a vehicle.

BACKGROUND

Modern vehicles are frequently equipped with multi-speed, dual-clutch transmissions (DCT) as part of the subject vehicle's powertrain. Such DCTs are favored for their increased mechanical efficiency in comparison with typical, torque-converter equipped automatic transmissions. Additionally, DCTs are often preferred over typical automated manual transmissions for the capability of DCTs to provide higher quality gear shifts.

A typical DCT employs two friction clutches for shifting among its forward ratios, and accomplishes such shifts by alternating engagement between one and the other of the two friction clutches. Such a multi-speed, dual-clutch transmission may be utilized in a hybrid vehicle, i.e., a vehicle employing two or more distinct power sources, such as an engine and an electric motor, for transmitting propulsion energy to the subject vehicle's driven wheels.

During operation of a vehicle equipped with a DCT, significant amounts of heat or thermal loads may be generated within the DCT clutches due to clutch slip used during launching or accelerating the vehicle. When such loads exceed specific thresholds, performance and durability of the DCT clutches, as well as general performance of the DCT and the vehicle, may be adversely affected.

SUMMARY

A method is disclosed for managing clutch thermal loads in a multi-speed dual-clutch transmission (DCT) that is paired with an internal combustion engine in a vehicle. The method includes assessing whether the vehicle is being accelerated by the engine and identifying a clutch in the DCT that is being slipped during the acceleration. The method also includes determining vehicle parameters indicative of an amount of time remaining until the clutch will cease to slip, determining the amount of time remaining until the clutch will cease to slip using the determined vehicle parameters, and determining an amount of time remaining until the clutch reaches a threshold temperature. The method additionally includes comparing the determined amount of time remaining until the clutch will cease to slip with the determined amount of time remaining until the clutch reaches the threshold temperature. Furthermore, the method includes activating an indicator if the determined amount of time remaining until the clutch reaches the threshold temperature is less than the determined amount of time remaining until the clutch will cease to slip.

The threshold temperature may be indicative of the clutch being overheated. In such a case, the method may additionally include regulating the operation of the DCT such that energy input to the clutch is reduced when the clutch substantially reaches the threshold temperature.

The act of regulating operation of the DCT such that energy input to the clutch is reduced may include disengaging the clutch.

The clutch may be in the process of being engaged in a forward gear ratio of the DCT. In such a case, the clutch may cease to slip upon an upshift to another gear ratio via the other of the two clutches.

The determined vehicle parameters may include road speed and acceleration of the vehicle, and position of a vehicle accelerator. The vehicle parameters may then be assembled into a DCT upshift table and programmed into the controller for appropriate access.

The clutch may be in the process of being engaged in a reverse gear ratio of the DCT. In such a case, the clutch may cease to slip upon lock up of the clutch.

Each of the acts of assessing whether the vehicle is subject to the acceleration event, identifying the clutch in the DCT that is being slipped during the acceleration event, determining vehicle parameters indicative of the amount of time remaining until the clutch will cease to slip, determining the amount of time remaining until the clutch will cease to slip, determining the amount of time remaining until the clutch reaches the threshold temperature, comparing the determined amount of time remaining until the clutch will cease to slip with the determined amount of time remaining until the clutch reaches the threshold temperature, and activating the indicator may be accomplished via a controller.

The method may additionally include activating the indicator when the clutch substantially reaches the threshold temperature.

The indicator may be at least one of an audible signal and a visual display. Additionally, the visual display may include a request for an operator of the vehicle to at least one of i) increase speed or apply a vehicle brake, and ii) apply and hold the vehicle brake. The indicator may additionally include a coded message stored in the controller and configured to be retrieved on demand.

The clutch may be one of an odd-ratio clutch and an even-ratio clutch.

A vehicle having a DCT, an internal combustion engine, and the controller configured to manage thermal loading on the clutch in the DCT is also disclosed.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

A dynamically-shiftable multi-speed dual-clutch transmission (DCT) may be employed as part of a powertrain for a vehicle in order to further enhance the vehicle's efficient use of non-renewable sources of energy, such as fossil fuels. Such a DCT may be provided for a vehicle having a conventional powertrain employing solely a single internal combustion engine for powering the vehicle, or a hybrid type of a powertrain, wherein the vehicle may be powered by an engine, an electric motor, or a combination of the two.

As used herein, the term "dynamically-shiftable" relates to employing a combination of two friction clutches and several dog clutch/synchronizers to achieve "power-on" or dynamic shifts by alternating between engagement of one friction clutch and the other. Additionally, "dynamic shifting" means that drive torque is present in the transmission when a clutched shift to an oncoming speed ratio is made. Generally, the synchronizers are physically "pre-selected" for the oncoming ratio prior to actually making the dynamic shift. As will be readily understood by those skilled in the art, prior to making a "dynamic shift", synchronizers are "pre-selected" to the necessary positions of both the oncoming and off-going ratios prior to actually shifting the torque path from one clutch to the other. The pre-select condition is postponed as long as possible to minimize spin losses because pre-selecting the next ratio forces a speed difference in the open, i.e., not engaged, clutch. This particular gear arrangement allows the combination of torque-transmitting mechanisms for any ratio and its neighboring ratio (i.e., ratio N and ratio N+1) without obtaining a mechanical tie-up in the transmission.

Figure 1:
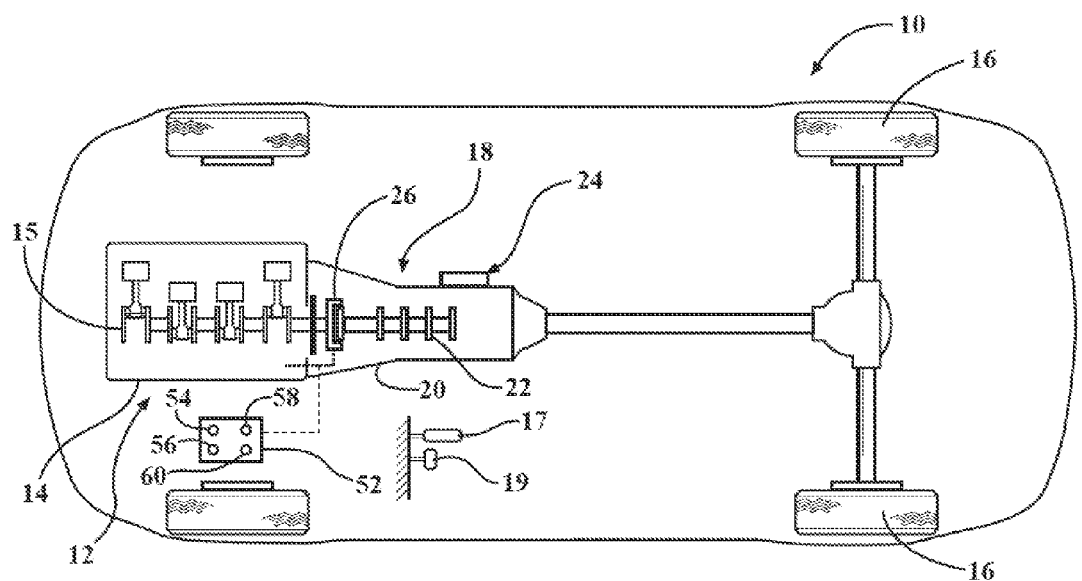
FIG. 1 is a schematic representation of a vehicle powertrain having an internal combustion engine and a dynamically-shiftable, dual-clutch transmission (DCT).

Referring to FIG. 1, a vehicle 10 having a powertrain 12 is depicted. The powertrain 12 includes an internal combustion engine 14 configured to generate torque, drive wheels 16 configured to interface with a road surface, and a DCT 18 operatively connected to the engine 14 and configured to transmit engine torque to the drive wheels. A vehicle accelerator 17, such as a pedal or a lever, is provided for a vehicle operator in order to control engine power to drive the vehicle 10. A vehicle brake 19, shown as a pedal in FIG. 1, is provided for the vehicle operator in order to restrain motion of the vehicle 10. Although not specifically shown, as noted above, the powertrain 12 may be configured as a hybrid type and additionally include an electric motor.

The engine 14 utilizes a crankshaft 15 for converting reciprocal motion into rotational motion, as is understood by those skilled in the art. The DCT 18 is paired with the engine 14 at an engine-transmission interface using any appropriate means, including fasteners (not shown) such as threaded screws and dowels. The DCT 18 includes a transmission case 20 for housing a geartrain 22 that is configured to provide a predetermined number of selectable gear ratios for connecting the engine crankshaft 15 to the drive wheels 16. The DCT 18 also includes a controls subsystem 24 employed to control operation of a clutch subsystem 26.

Although not specifically shown, the controls subsystem 24 may generally include an electric drive system that is configured to convert DC current of an on-board energy storage device, such as a battery, into AC current for powering a three-phase electric motor. The electric motor may then be employed to drive an electric pump to pressurize a body of control fluid, such as pentosin, through a DCT valvebody that includes a system of valves and solenoids. In turn, the DCT valvebody employs the system of valves and solenoids to direct the pressurized fluid to regulate operation of the clutch system 26.

Figure 2:
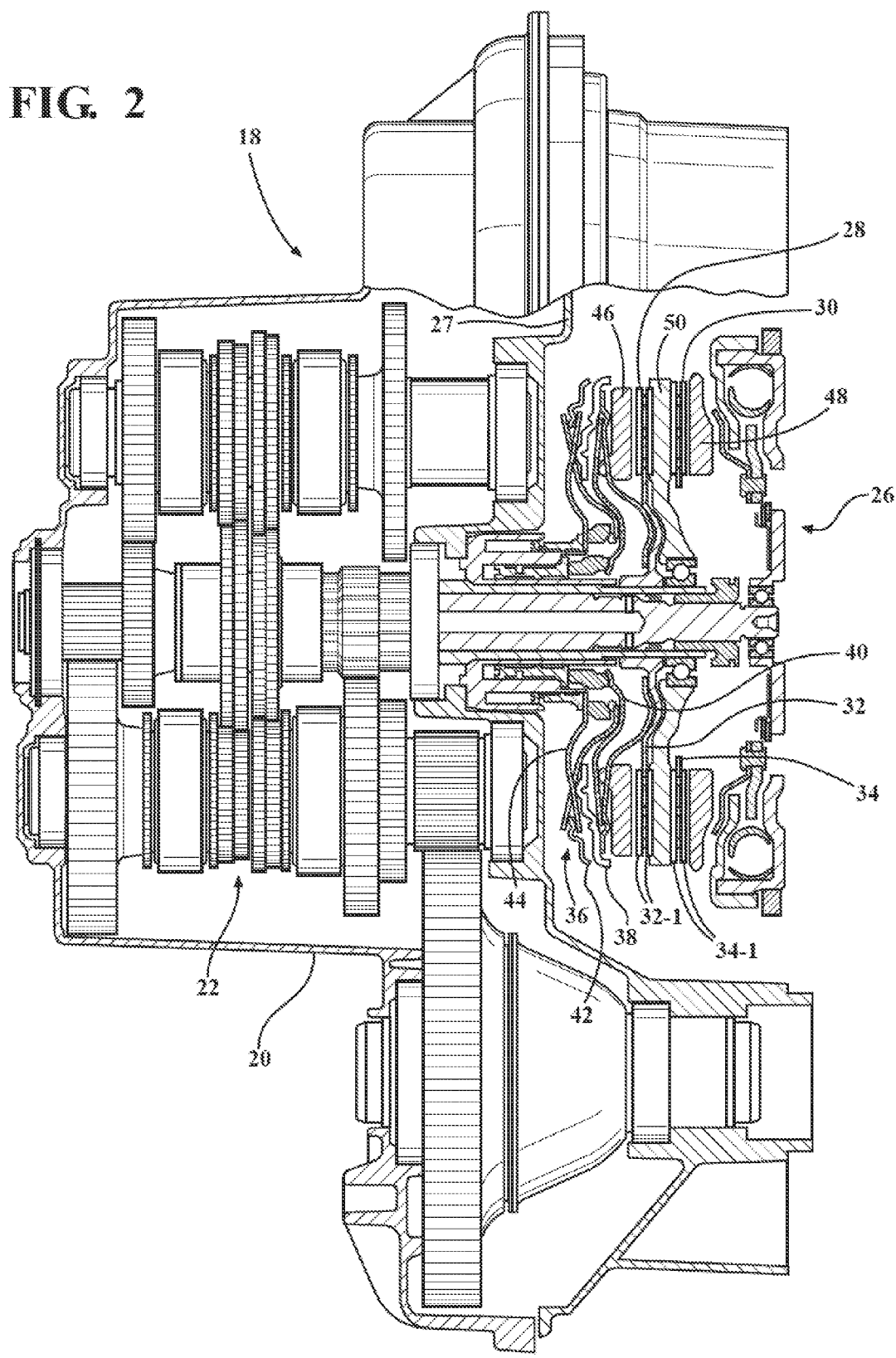
FIG. 2 is a schematic representation of a cross-sectional view of the DCT shown in FIG. 1, specifically illustrating the transmission clutches.

As shown in FIG. 2, the clutch subsystem 26 is located inside a clutch housing 27 and includes dry clutches 28 and 30. As shown, the clutch 28 is an even-ratio clutch, and the clutch 30 is an odd-ratio clutch. The clutches 28, 30 are configured to select the particular drive gear ratio in the DCT 18. Specifically, the clutch 28 includes a clutch plate 32 having friction facings 32-1, while the clutch 30 includes a clutch plate 34 having friction facings 34-1. The DCT 18 also includes a clutch cover 36, which has a portion 38 employed to actuate the clutch 28 via a spring 40 and a portion 42 employed to actuate the clutch 30 via a spring 44. The clutch 28 also includes a pressure plate 46, while the clutch 30 includes a pressure plate 48.

Additionally, clutches 28 and 30 share a center plate 50, wherein each of the pressure plates 46 and 48 clamp the respective friction facings 32-1 and 34-1 against the center plate 50 through the action of the springs 40 and 44 at a preselected rate to engage the respective clutch. During operation of the DCT 18, when one of the clutches 28, 30 is transmitting engine torque in any particular ratio, the other of the two clutches pre-selects an appropriate synchronizer of the oncoming ratio. The above-described valvebody controls selective engagement of the clutches 28, 30 by directing the control fluid to various solenoids (not shown) that in turn regulate flow of the control fluid to the appropriate clutch.

During operation of the vehicle 10, when the DCT 18 is transmitting engine torque, thermal loading on the clutch subsystem 26 may become excessive, i.e., one or more of the clutches 28, 30 may experience a rapid temperature increase and an over-heat condition. Such thermal loading is frequently the result of clutch slip used to launch the vehicle 10 and during gear shifts of the DCT 18. Consequently, if not addressed, such excessive thermal loading may lead to reduced performance and durability of friction facings 32-1 and 34-1, as well as general performance of the DCT 18 and the vehicle 10. What constitutes excessive thermal loading with respect to the clutches 28, 30 may be based on operating requirements of the DCT 18, as well as on durability limits of the facings 32-1 and 34-1, as well as other components of the respective clutches.

With renewed reference to FIG. 1, the vehicle 10 also includes a controller 52 that may be a dedicated transmission controller configured to regulate operation of the DCT 18, or an integrated powertrain controller configured to regulate operation of the entire powertrain 12. The controller 52 is also programmed with an algorithm and configured to manage thermal loads on clutches 28, 30 in the DCT 18. As part of its managing of the thermal loads on clutches 28, 30, the controller 52 is programmed to assess whether the vehicle 10 is being accelerated by the engine 14. In such a case, the engine 14 has previously been started and the vehicle 10 has been commanded by its operator to either launch from a stop or accelerate from a roll, with the DCT 18 transmitting engine torque to the drive wheels 16.

Additionally, the controller 52 is programmed to identify which clutch of the clutches 28 and 30 is being slipped during the acceleration event. Such a determination is easily achieved based on the knowledge of which gear has been selected in the DCT 18 during the acceleration event. In the case when the vehicle is being launched from a stop, it is most likely that the torque transferring and, therefore, the slipping clutch would be the odd-ratio clutch 30 while engaging first gear. However, the even-ratio clutch 28 may also be used, if it is deemed desirable to launch the vehicle 10 in a higher, such as second, gear. The controller 52 is programmed to determine an amount of time remaining until the subject clutch 28 or 30 will cease to slip. The determination for the amount of time remaining until the subject clutch 28 or 30 will cease to slip may be based on design calculations and/or empirically derived data.

The controller 52 is also programmed to determine vehicle operating parameters 54 indicative of an amount of time remaining until the slipping clutch 28 or 30 will cease to slip. Such vehicle parameters 54 may include speed and acceleration data of the vehicle 10. Additionally, another one of the pertinent vehicle parameters 54 may include a position of the accelerator 17. A particular position of the accelerator 17 may be indicative of the vehicle 10 being accelerated while the subject clutch 28 or 30 is controlled to slip in order to facilitate gradual application of engine power to the drive wheels 16 and/or gradually synchronize the rotating speed of the drive wheels with the speed of the engine 14. Accordingly, when the clutch 28 or 30 is being engaged during vehicle launch to transmit sharply applied engine torque, and also in the process of a hand off from one gear to the next during a gear change for driving the vehicle 10, the subject clutch undergoes controlled slip. Some or all of the vehicle parameters 54 may be assembled into a DCT upshift table 56 which may then be programmed into the controller 52 for subsequent access during operation of the vehicle 10.

The subject clutch 28 or 30 may be in the process of being engaged in a forward gear ratio of the DCT 18. In such a situation, the clutch 28 or 30 may cease to slip when the DCT 18 undergoes an upshift to another forward gear ratio via the other of the two clutches 28, 30. The subject clutch 28 or 30 may be in the process of being engaged in a reverse gear ratio of the DCT 18. In such a situation, the clutch 28 or 30 may cease to slip when the subject clutch locks up.

The controller 52 is also programmed to determine the amount of time remaining until the clutch 28 or 30 will cease to slip using the determined vehicle parameters 54. In other words, the controller 52 may look up the DCT upshift table 56 to determine when then the DCT 18 will experience an upshift into another forward gear ratio. The controller 52 is additionally programmed to determine an amount of time remaining until the clutch 28 or 30 reaches a threshold temperature 58. The threshold temperature 58 of the particular clutch 28 or 30 is indicative of the clutch having absorbed sufficient thermal energy to be within a predetermined range of the above-described over-heat condition. Within the meaning of the present disclosure, the threshold temperature 58 may be a value that corresponds to the clutch 28 or 30 having absorbed excessive thermal loading. In one embodiment, the threshold temperature 58 may be a temperature value that was previously assessed on or near the friction surface of the pressure plate 46 or the pressure plate 48. In another embodiment, the threshold temperature 58 may be a temperature value that was previously assessed on or near the friction surface of the clutch facings 32-1 or 34-1. Such threshold temperature data may then be assembled into a table to be programmed into the controller 52 for subsequent access during operation of the DCT 18.

The controller 52 is additionally programmed to compare the determined amount of time remaining until the clutch 28 or 30 will cease to slip with the determined amount of time remaining until the subject clutch reaches the threshold temperature 58. Accordingly, such a comparison will facilitate a determination whether the subject clutch 28 or 30 is predicted to cease slipping before the threshold temperature 58 has been reached. Also, the controller 52 is programmed to activate an indicator 60 if the determined amount of time remaining until the clutch 28 or 30 reaches the threshold temperature 58 is less than the determined amount of time remaining until the subject clutch will cease to slip. The indicator 60 may also be activated when the subject clutch 28 or 30 substantially reaches the threshold temperature 58. The indicator 60 may be an audible signal and/or a visual display. The visual display may include a communicated request for an operator of the vehicle 10 to at least one of i) increase speed or apply the vehicle brake 19, and ii) apply and hold the vehicle brake 19. The indicator may additionally include a coded message stored in the controller 52 and configured to be retrieved on demand.

The controller 52 may also be configured to regulate operation of the DCT 18 such that energy input into the particular clutch 28 or 30 is reduced when the subject clutch substantially reaches the threshold temperature 58. Accordingly, the clutch 28 or 30 may be considered as having substantially reached the threshold temperature 58 if the clutch temperature is within a predetermined temperature range of the threshold temperature. To thus reduce energy input to the particular clutch 28 or 30, the controller 52 may disengage the subject clutch.

Figure 3:
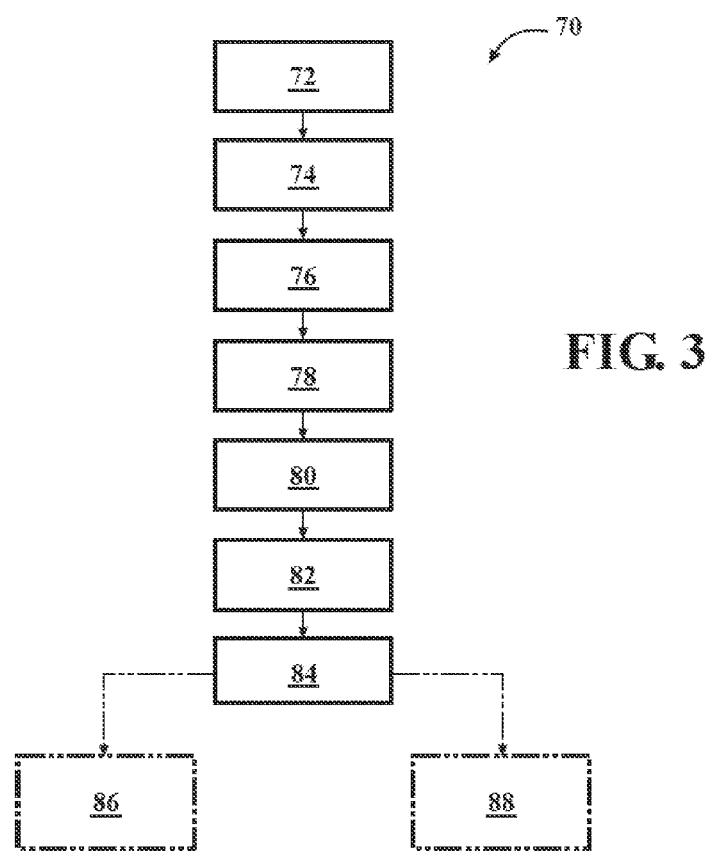
FIG. 3 is a flow chart illustrating a method of managing clutch thermal loads in the DCT depicted in FIGS. 1-2.

FIG. 3 depicts a method 70 of managing clutch thermal loads in the DCT 18, as described above with respect to FIGS. 1-2. The method commences in frame 72 with assessing via the controller 52 whether the vehicle 10 is being accelerated by the engine 14. From frame 72, the method proceeds to frame 74, where the method includes identifying via the controller 52 which clutch from the clutches 28 and 30 is being slipped during the acceleration. From frame 74 the method moves on to frame 76. In frame 76 the method includes determining via the controller 52 vehicle parameters 54 that, as described with respect to FIGS. 1-2, are indicative of the amount of time remaining until the clutch 28 or 30 will cease to slip.

After frame 76, the method advances to frame 78 where the method includes determining via the controller 52 the amount of time remaining until the clutch 28 or 30 will cease to slip using the determined vehicle parameters 54. Following frame 78 the method proceeds to frame 80, where the method includes determining via the controller 52 the amount of time remaining until the clutch 28 or 30 reaches the threshold temperature 58. From frame 80 the method moves on to frame 82. In frame 82 the method includes comparing via the controller 52 the determined amount of time remaining until the clutch 28 or 30 will cease to slip with the determined amount of time remaining until the subject clutch reaches the threshold temperature 58.

Furthermore, after frame 82, the method advances to frame 84 where the method includes activating via the controller 52 the indicator 60 if the determined amount of time remaining until the clutch 28 or 30 reaches the threshold temperature 58 is less than the determined amount of time remaining until the subject clutch will cease to slip. Following frame 84 the method may advance to frame 86 where it may additionally include regulating via the controller 52 the operation of the DCT 18 such that energy input to the subject clutch 28 or 30 is reduced when the clutch substantially reaches the threshold temperature 58. Additionally, after frame 84 the method may proceed to frame 88, where the method may include activating via the controller 52 the indicator 60 when the subject clutch 28 or 30 substantially reaches the threshold temperature 58.

The described method is intended to facilitate increased durability and extended operating life for the DCT 18 and specifically of the clutches 28 and 30 while also enhancing the user-friendliness of the DCT 18. Such enhancement of the user-friendliness of the DCT 18 is achieved by permitting the vehicle 10 to perform desired maneuvers without generating premature warnings as to an overloaded clutch or reducing performance of the vehicle, if the clutch 28 or 30 that is being engaged and slipped will cease to slip prior to actually being overheated.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of managing clutch thermal loads in a multi-speed dual-clutch transmission (DCT) that is paired with an internal combustion engine in a vehicle, the method comprising:

assessing via a controller whether the vehicle is being accelerated by the engine;

identifying via the controller a clutch in the DCT that is being slipped during the acceleration;

determining via the controller vehicle parameters indicative of a preset amount of time remaining until the clutch will cease to slip;

accessing via the controller the preset amount of time remaining until the clutch will cease to slip that corresponds to the determined vehicle parameters;

determining via the controller an actual amount of time remaining until the clutch being slipped reaches a threshold temperature;

comparing via the controller the accessed preset amount of time remaining until the clutch will cease to slip with the determined actual amount of time remaining until the clutch being slipped reaches the threshold temperature to determine whether the clutch is predicted to cease slipping before the threshold temperature has been reached; and activating via the controller an indicator if the determined actual amount of time remaining until the clutch being slipped reaches the threshold temperature is less than the accessed preset of time remaining until the clutch will cease to slip.

2. The method of claim 1, wherein the threshold temperature is indicative of the clutch being overheated, the method further comprising regulating an operation of the DCT such that energy input to the clutch is reduced when the clutch substantially reaches the threshold temperature.

3. The method of claim 2, wherein said regulating the operation of the DCT such that energy input to the clutch is reduced includes disengaging the clutch.

4. The method of claim 1, wherein the clutch is in the process of being engaged in a forward gear ratio of the DCT and the clutch ceases to slip upon an upshift to another forward gear ratio using another clutch.

5. The method of claim 4, wherein the determined vehicle parameters include road speed and acceleration of the vehicle, and position of a vehicle accelerator.

6. The method of claim 1, wherein the clutch is in the process of being engaged in a reverse gear ratio of the DCT and the clutch ceases to slip upon lock up of the clutch.

7. The method of claim 1, further comprising activating the indicator when the clutch substantially reaches the threshold temperature.

8. The method of claim 1, wherein the indicator is at least one of an audible signal and a visual display.

9. The method of claim 8, wherein the indicator is the visual display, and wherein the visual display includes a request for an operator of the vehicle to at least one of i) increase speed or apply a vehicle brake, and ii) apply and hold the vehicle brake.

10. The method of claim 1, wherein the clutch is one of an odd-ratio clutch and an even-ratio clutch.

11. A vehicle comprising:

an internal combustion engine configured to generate engine torque;

a drive wheel configured to interface with a road surface;

a multi-speed dual-clutch transmission (DCT) operatively connected to the engine and configured to transmit engine torque to the drive wheel; and a controller configured to:

assess whether the vehicle is being accelerated by the engine;

identify a clutch in the DCT that is being slipped during the acceleration;

determine vehicle parameters indicative of a preset amount of time remaining until the clutch will cease to slip;

access the preset amount of time remaining until the clutch will cease to slip that corresponds to the determined vehicle parameters;

determine an actual amount of time remaining until the clutch being slipped reaches a threshold temperature;

compare the accessed amount of time remaining until the clutch will cease to slip with the determined actual amount of time remaining until the clutch being slipped reaches the threshold temperature to determine whether the clutch is predicted to cease slipping before the threshold temperature has been reached; and activate an indicator if the determined actual amount of time remaining until the clutch being slipped reaches the threshold temperature is less than the accessed amount of time remaining until the clutch will cease to slip.

12. The vehicle of claim 11, wherein the threshold temperature is indicative of the clutch being overheated, and wherein the controller is additionally configured to regulate the operation of the DCT such that energy input to the clutch is reduced when the clutch substantially reaches the threshold temperature.

13. The vehicle of claim 12, wherein the controller regulates operation of the DCT such that energy input to the clutch is reduced by disengaging the clutch.

14. The vehicle of claim 11, wherein the clutch is in the process of being engaged in a forward gear ratio of the DCT and the clutch ceases to slip upon an upshift to another forward gear ratio using another clutch.

15. The vehicle of claim 14, wherein the determined vehicle parameters include road speed and acceleration of the vehicle, and position of a vehicle accelerator.

16. The vehicle of claim 11, wherein the clutch is in the process of being engaged in a reverse gear ratio of the DCT and the clutch ceases to slip upon lock up of the clutch.

17. The vehicle of claim 11, wherein the controller is additionally configured to activate the indicator when the clutch substantially reaches the threshold temperature.

18. The vehicle of claim 11, wherein the indicator is at least one of an audible signal and a visual display.

19. The vehicle of claim 18, wherein the indicator is the visual display, and wherein the visual display includes a request for an operator of the vehicle to at least one of i) increase speed or apply a vehicle brake, and ii) apply and hold the vehicle brake.

* * * * *